United States Patent [19]
Hyatt

[11] 3,713,275
[45] Jan. 30, 1973

[54] PIPELINE BUNDLE LAYING OPERATIONS

[75] Inventor: Alfred Ray Hyatt, Grest Yarmouth, England

[73] Assignee: Brown & Root Inc., Houston, Tex.

[22] Filed: Jan. 13, 1972

[21] Appl. No.: 217,546

[52] U.S. Cl. ............... 61/72.3, 53/198, 138/111, 138/112, 166/6
[51] Int. Cl. ....... B63b 35/04, F16l 1/00, B65b 13/00
[58] Field of Search ........... 61/72.3, 72.1, 72.4, 72.6; 53/3, 198 R; 138/111, 112; 166/.5, .6

[56] References Cited

UNITED STATES PATENTS

| 1,060,785 | 5/1913 | Pahl | 61/72.3 |
| 3,086,369 | 4/1963 | Brown | 61/72.3 |
| 3,604,731 | 9/1971 | Petersen | 166/.6 |

*Primary Examiner*—Jacob Shapiro
*Attorney*—Burns, Doane, Swecker & Mathis

[57] ABSTRACT

A pipeline laying operation wherein a continuous pipeline bundle comprised of a plurality of conduits is payed out from a floating vessel onto a submerged surface under the control of a tensioned flexible cable. The conduits are bundled together at a plurality of longitudinally spaced bundling zones by bundling cables surrounding the conduits in the form of a clove hitch. The tensioned cable is positioned so as to extend essentially freely longitudinally of the pipeline bundle within the confines of envelope defined by the bundling cables, and is operable to support the pipeline bundle while the bundling zones are sufficiently spaced as to prevent substantial relative longitudinal movement of the pipeline bundle along the cable.

8 Claims, 11 Drawing Figures

PATENTED JAN 30 1973

PIPELINE BUNDLE LAYING OPERATIONS

BACKGROUND OF THE INVENTION

This invention relates to pipeline laying operations. More particularly this invention relates to pipeline operations for laying a continuous pipeline bundle, comprised of a plurality of conduits, from a floating vessel means and onto a submerged surface.

In the past, pipeline systems have been proposed wherein a plurality of conduits, grouped in a pipeline bundle, are positioned on a submerged surface. Such systems are exemplified in the disclosures of a United States Fuller Pat. No. 3,425,453 and a United States Brown Pat. No. 3,086,369.

The technique described in the Brown patent involves the banding of conduits together into a bundle at a shore location, and thereafter floating the bundle to a offshore position. From this position, the bundle is lowered to a submerged surface. According to the Fuller patent disclosure, a multi-conduit pipeline is fabricated on a floating vessel by welding a plurality of circumferentially spaced conduits peripherially to a core conduit, or by welding a plurality of circumferentially spaced conduits to circumferentially spaced rods. Although such techniques may be acceptable for some purposes, they may often prove undesirable for a number of reasons.

For example, the Brown technique may prove cumbersome in the fabrication of pipelines of significant lengths. It would, therefore, be more desirable to provide a pipeline laying operation wherein the positioning of a pipeline bundle on a submerged surface may be accomplished by paying out the bundle from a floating vessel than to fabricate the pipeline bundle on a shore location and float sections of such bundles to an offshore location.

On the other hand, the Fuller technique, which involves reliance upon a longitudinally welded nature of the conduit grouping, may unduly stiffen the pipeline bundle being laid. Moreover, the actual operation of welding the conduits longitudinally together, and the resulting need for inspection of each weld, may prove costly to an excessive amount. Problems of failure by reason of stress problems which may be created by such welding operation could also be compounded.

It would, therefore, be desirable to provide a novel technique wherein a plurality of conduits forming a continuous pipeline bundle may be continuously paid out as a bundle from the floating vessel and onto a submerged surface, without unduly stiffening the pipeline bundle and without requiring a welding operation for bundling.

The present invention embraces such a technique through the utilization of a cable from which the pipeline bundle is suspended and through which the pipeline bundle is controllably paid out from a floating vessel onto a submerged surface. With girding means for bundling the conduits together spaced sufficiently close to prevent excessive sagging of the pipeline bundle, and with the cable extending freely longitudinally of the bundle within the confines of the bundle envelope defined by the girding means, the weight of the pipeline bundle is reacted by tension applied to the cable as discussed more fully hereafter.

The use of a cable means in connection with the offshore paying out of a cable, as in the case of a United States Pahl Pat. No. 1,060,785, and in connection with paying out of a single conduit pipeline, as in the case of a United States Sanford Pat. No. 580,226, has earlier been proposed.

These prior art concepts, however, fail to suggest an efficient solution to laying a pipeline bundle by employing a cable to control the profile of the bundle for a variety of reasons.

For example, the Sanford technique utilizes a clamp integrally joined with conduit sections for purposes of clamping the conduit to the cable. It will be readily apparent that the provision of such an integral clamp may require additional inspection operations to insure the integrity of the conduit, the absence of which may result in costly repairs. Also, if such a technique were adapted to the laying of a bundled group of pipelines, the pipeline bearing the clamps would necessarily support the weight of the entire pipeline group, unless each pipeline of the group were provided with a clamp.

Neither of these alternatives may be entirely acceptable since the first might create additional stress problems and the second might involve precision control of the tension in all cables associated with the clamps of each of the pipelines, as well as precise spacing of the clamps on the various pipelines themselves.

The Pahl technique, if adapted to laying pipelines in a bundle may avoid the use of such a clamp but would require that the bundle be serviced to the cable through a continuous wrapping wire or spaced wire ties. Such a technique could present many operationally unacceptable problems such as difficulty in maintenance of the pipelines in an acceptably stable bundle orientation.

Various other problems may be envisioned in connection with attempts to lay continuous pipelines in a bundle utilizing a cable to control the paying out of and the profile of the pipeline bundle.

OBJECTS AND SUMMARY OF THE INVENTION

It is, therefore, a general object of the present invention to provide a novel pipeline laying technique for laying a continuous pipeline bundle comprised of a plurality of pipelines from a floating vessel means and onto a submerged surface while obviating and minimizing problems of the sort previously noted.

Recognizing problems such as maintaining the integrity of the pipelines in the bundle, insuring an acceptably stable orientation of the pipelines in the bundle, and efficiently, as well as economically, operatively coupling the pipeline bundle to the cable, it is a particular object of the invention to provide such a technique wherein bundling may be obtained through the use of spaced girding means surrounding the pipelines in the bundle, while the cable extends essentially freely longitudinally of the bundle within the confines of the bundle envelope defined by the girding means.

It is a related object of the present invention to provide such a technique wherein the load of the pipeline bundle is transmitted to the cable without the need for securing any clamps directly to the pipelines, and without the need for tying the cable to the pipelines of the bundle.

It is a further related object of the invention to provide such a technique wherein bundling of the pipelines is enhanced through utilizing a clove hitch type girding arrangement.

A preferred embodiment of the invention intended to accomplish at least some of the foregoing objects entails the laying of a continuous pipeline bundle, comprised of a plurality of conduits, from a floating vessel means onto a submerged surface. The conduits are bundled together, at a plurality of bundling zones spaced longitudinally along the conduits, by girding means surrounding the conduits and defining a bundle envelope.

A payout and profile control cable means extends from the floating vessel means along the continuous pipeline bundle within the confines of the bundle envelope. This cable means is positioned so as to extend essentially freely longitudinally of the pipeline bundle, i.e., no external force such as that provided by trapping the cable with conduit spacer means, cable clamp means, or the like constrains relative longitudinal movement between the pipeline bundle and the cable means.

The cable means is operable to suspend the pipeline bundle while the bundling zones are sufficiently closely spaced as to prevent substantial relative longitudinal movement of the pipeline bundle along the essentially freely longitudinally extending cable means, i.e., the close bundling zone spacing prevents sagging of the type which might otherwise permit the pipeline bundle to ride down the cable means into the body of water without other restraint on the bundle.

Tensioning means on the floating vessel is provided for imparting tension to the cable means in order to control the cable profile and the profile of the conduits in the bundle. The weight of the pipeline bundle is reacted by tensile forces in the cable means.

Bundling may be accomplished by surrounding the conduits with bundling cable girding means in the form or configuration of a clove hitch. By hauling the cable girding means taut, the conduits are brought toward one another. The cable girding means is then clamped in the taut position.

A particularly stable operation may be enhanced where the payout and profile control cable means is initially located within the bundle envelope below an upper nip zone defined by the conduits held adjacent one another by the girding means. This cable means is subsequently snapped between those adjacent conduits into the upper nip zones as the suspended pipeline bundle is payed out.

Other objects and advantages of the present invention will become apparent from the subsequent detailed description thereof with reference to the accompanying drawings in which like numerals refer to like elements, and in which:

THE DRAWINGS

Figure 10:
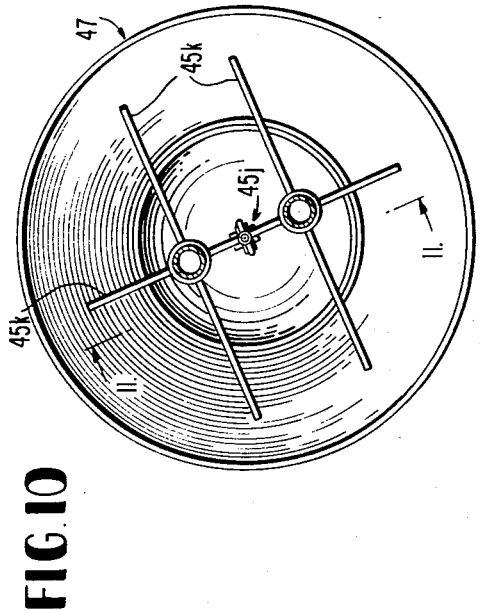
Figure 11:
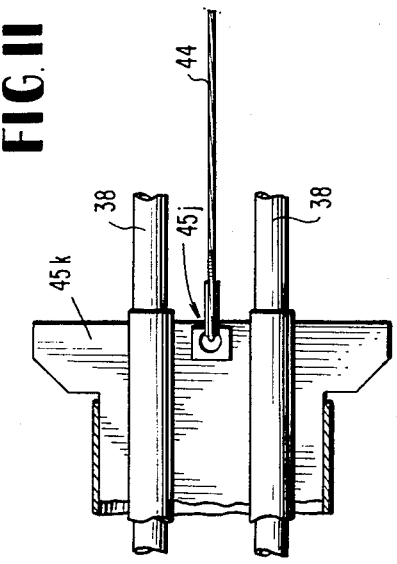
Figure 9:
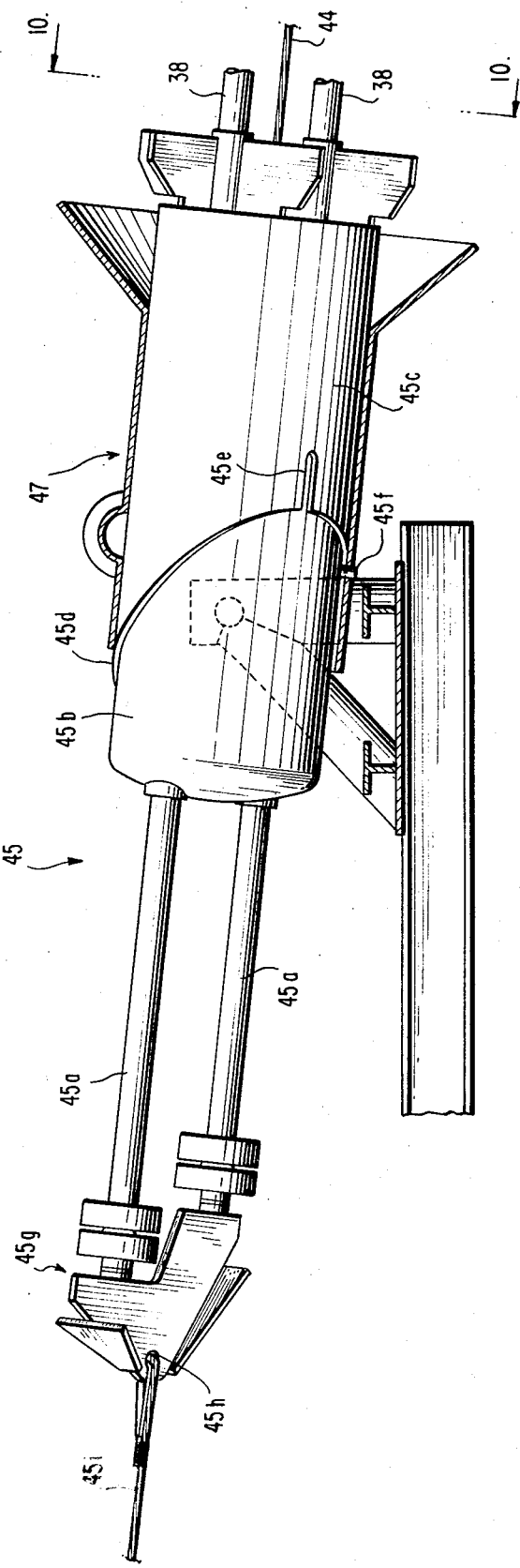

FIG. 9 provides a partially sectioned, side elevational view of a pipeline bundle pulling assembly, illustrating the manner in which a tension cable operated pulling assembly serves to rotate the bundle within a pipeline socket means into a predetermined rotary position;

FIG. 10 provides an end view of the FIG. 9 illustration and depicts a connection of the payout and profile control cable means to the pulling head; and FIG. 11 is a partial cross-sectional view taken along line 11—11 of FIG. 10.

DETAILED DESCRIPTION

General Summary

With reference to the accompanying drawings, a preferred embodiment of a method and apparatus for laying pipelines grouped in a bundle, according to the present invention, may be understood.

Figure 1:
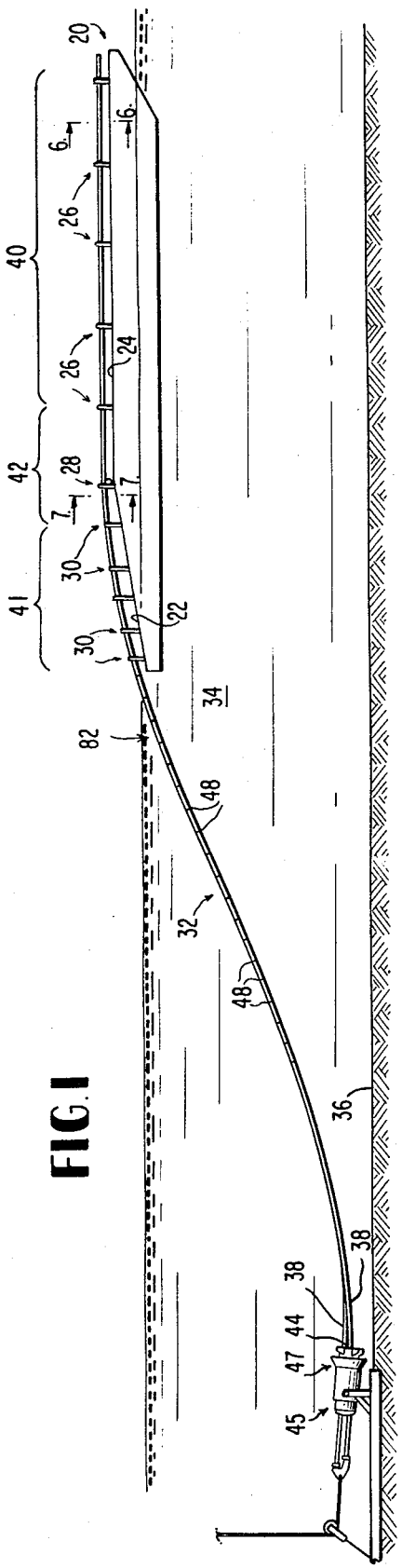
FIG. 1 is a side elevational view schematically depicting floating vessel means involved in a pipeline bundle laying operation according to the present invention.

As may be seen in FIG. 1, the pipeline laying operation according to the present invention utilizes a floating vessel means 20 which may be provided with a ramp 22 as a fixed portion thereof at the starboard side of the stern. The ramp 22 is generally inclined with respect to the deck 24 of the floating vessel means.

Slidably supported by rotatable rollers and guided on the floating vessel means 20, at a plurality of conduit guiding and supporting stations 26, 28 and 30, hereinafter more fully described, are a plurality of elongate, flexible conduits ultimately grouped in an elongate, flexible pipeline bundle, schematically indicated at 32. The bundle 32 depends from the floating vessel means 20 into a body of water 34 toward a submerged surface 36.

In the embodiment of the present invention as illustrated two conduits 38, 38 of generally the same diameter (e.g. about 4 inches) are depicted as being involved in the laying of the bundle 32 which, as the vessel means 20 is moved to the right as viewed, in FIG. 1, will rest on the submerged surface. It will, however, be appreciated that the present invention may be adapted to, and embraces, bundle laying operations wherein different numbers of conduits and other diametrical relationships are involved.

The conduit guiding and supporting stations 26, 28 and 30 cooperate to define feed paths for laterally and generally longitudinally guiding the conduits 38 on the floating vessel means 20. As will become apparent from the subsequent discussion of FIG. 6, the initial stations 26 may be located on the vessel deck 24 forward of the inclined ramp portion 22, and these stations 26 function together as the initial feed path zone 40 generally longitudinally aligned with that inclined ramp portion 22.

During passage of conduits through the initial feed path zone 40, the conduits are maintained laterally spaced from one another by substantially a fixed distance. Maintenance of the conduits laterally separated facilitates joining of additional pipe sections (not shown) to each of the conduits, as well as related operations such as joint inspection and the like. As will be appreciated, suitable welding stations and inspection stations (not shown), etc. are provided in the initial feed path zone 40. Also, pipe section storage areas and pipe section manipulating equipment (not shown) may be suitably provided.

The remaining guiding and support stations 28 and 30 are suitably located at longitudinally spaced positions on the inclined ramp portion 22 of the floating vessel means 20. These stations 28 and 30 are generally longitudinally aligned, in the sense of being generally coplanar, with the stations 26 of the initial feed path zone 40.

One station 28 on the ramp 22 additionally functions as a cable payout station. Between some of the next illustrated stations 30 in the feed path two bundling stations 29 (see FIGS. 2–5) are located. Additional guiding and supporting stations 30 spaced along the ramp 22 in the terminal feed path zone 41 serve to establish a desired profile of the bundle 32 for entry into the water body 34 during payout.

Figure 3:
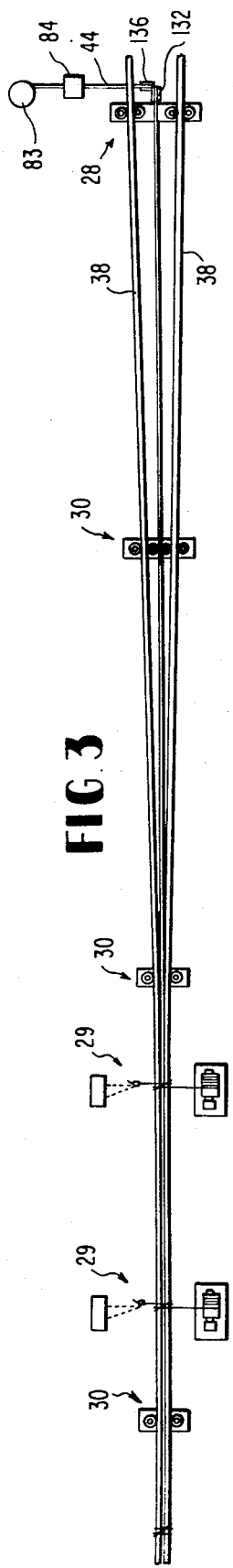
FIG. 3 is a top plan view of the fixed inclined ramp zone of floating vessel means shown in FIG. 2, the ramp itself being omitted.

As will be apparent from FIG. 3, the conduits to be grouped together in a bundle are caused to generally laterally converge toward one another, in the feed path zone 42 between the bundling stations 29 and the last guiding and supporting stations 26, for completion of a bundling operation. This convergance may be accomplished in any suitable manner such as that set forth in United States Application Ser. No. 159,343 filed July 2, 1971 by Leif H. Smith for "Method and Apparatus for Laying Pipelines Grouped in a Bundle;" the disclosure of that commonly assigned application is hereby incorporated by reference.

At the guiding, supporting and payout station 28, an elongate, flexible and tensioned cable means 44 is interposed intermediate the group of conduits for subsequent control over the profile and payout of the pipeline bundle 32. After the conduits pass that station 28 along their feed paths, they are bundled together at the bundling stations 29 in a manner hereinafter more fully described.

At this juncture it may be noted that the bundling is accomplished utilizing girding means 48. As will be appreciated, the banding or girding means 48 surround the conduits and define a bundle envelope. The cable means is positioned so as to extend essentially freely longitudinally of the pipeline bundle 32 within the confines of the bundle envelope to operatively couple the bundle to the cable means 44 by suspending the pipeline bundle from the cable means while the bundling zones are sufficiently closely spaced so as to prevent substantial relative longitudinal movement of the bundle along the cable means. In other words, the bundling zones are sufficiently closely spaced to prevent lateral buckling of the pipeline bundle which might otherwise result from the compressive load in the conduits.

As pointed out in the disclosure of the aforementioned Smith application, during initial stages of the laying operation, the generally central cable means 44 may be payed out and tied off to an anchor, platform leg, etc., or otherwise positioned in any suitable manner. A suitable deck engine (not shown) may be employed to apply tension to the cable during the laying operation. This tension is necessary to partially react the weight of the pipeline bundle 32 while laying. When the laying operation is completed, the terminal portion of the bundle may be set over the side of the floating vessel means 20 with suitable davits (not shown), or the floating vessel means may be moved ahead to lay out from under the pipeline bundle.

As an alternative procedure for initiating a laying operation, a pulling head assembly, such as that discussed particularly in connection with FIG. 9 of commonly assigned United States patent application Ser. No. 113,252 (filed Feb. 8, 1971 by Clyde E. Nolan, Jr. for "Apparatus for Providing Offshore Installation"), may be employed. The pertinent disclosure of that application is hereby incorporated by reference.

As may be seen in FIGS. 9-11 herein, pulling head means 45 including terminal, conduit portions 45a of the conduits 38 may be employed. The terminal portions of conduits 38 pass through, and are rigidly supported by a socketing, barrel portion 45b. The barrel portion is provided on its outer periphery with a camming sleeve 45c which provides a camming edge 45d, shown generally in FIG. 9, with a cam slot portion 45e.

A pin 45f cooperates with the camming edge 45d to effect rotation of the pipeline bundle within a pipeline socket means 47 to a predetermined rotary position in a manner more fully described in the aforementioned Nolan application. A pulling nose 45g provided with a hook receiving socket 45h for connection to a tension cable 45i may be employed to initiate the pipeline bundle laying operation. Tension on that cable 45i pulls the initial bundle from the vessel 20 into the socket means 47 located at an appropriate submerged location.

As indicated at 45j in FIGS. 10 and 11, the payout and profile control cable means 44 may be suitably attached to web means 45k generally centrally of the pulling head means 45 prior to initiating of the bundle laying operation. In this fashion initial socketing of the pulling head means 45 also properly locates the cable means 44 at a submerged location for continuation of the laying operation.

It will become apparent that, by reason of the provisions for conduit convergence to accomplish bundling, that the pulling head means 45 (which has a diametrical extent greater than that of the bundle) could be connected to the conduits 38 aft of the last conduit guiding and supporting station 30 to avoid interference therewith. It may also be noted that during the initiation of the laying operation utilizing the pulling head means 45, an initial conduit length need not be bundled thereby permitting gradual conduit divergance to accomodate the conduit spacing at the pulling head means. Thereafter, bundling operations may be engaged in continuously as hereinafter set forth. From that time onward, control over the conduits is exercised by the payout cable 44. Additional restraint on the conduits during the operation initiating stages can, if needed or desired, be accomplished on the barge through any suitable, conventional restraining techniques.

Detailed Structure and Operation

With continued reference to FIG. 1, and with reference specifically to FIGS. 2–8, details of one preferred embodiment of the present invention may be appreciated.

Figure 2:
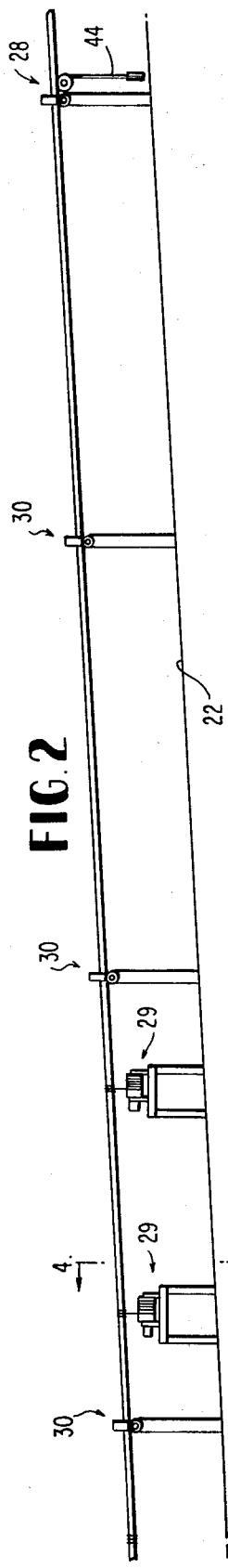
FIG. 2 is a partially cross-sectional, elevational view of a portion of the floating vessel means of FIG. 1 at the fixed inclined ramp zone and in somewhat greater detail.

In FIG. 2, a section of the floating vessel means 20 including a portion of the zone 42 of conduit convergence is illustrated, with the inclined ramp portion 22 of the barge 20 shown schematically. FIG. 3 is a top plan view at the inclined ramp section 22 shown in FIG. 2 (the ramp itself being omitted), and illustrates the conduit convergence.

Figure 6:
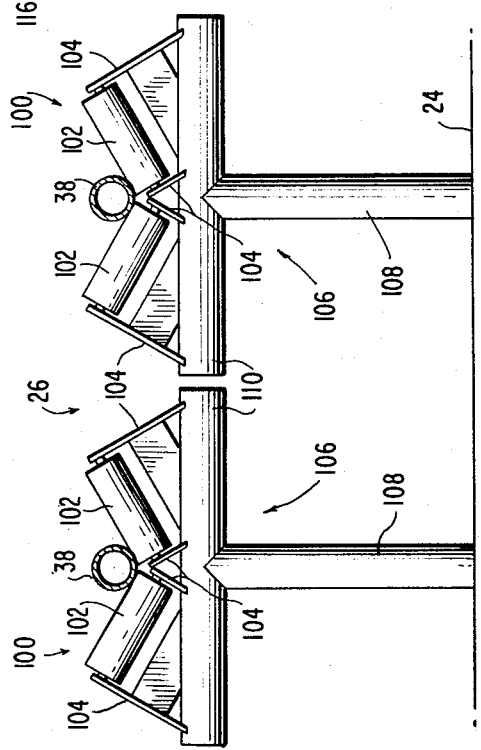
FIG. 6 is a transverse elevational view of a conduit guiding and supporting station along line 6—6 of FIG. 1.

FIG. 6 illustrates one form of the support stations 26 that may be located in the initial portion 40 of the conduit feed paths (see FIG. 1). In this arrangement, the support section 26 includes two roller assemblies 100 laterally spaced from one another to maintain the conduits 38 laterally spaced for purposes of facilitating joining of additional pipe sections and related operations.

These V-shaped roller assemblies 100 each include two rollers 102 supported by brackets 104 for rotation about mutually downwardly inclined axes. The converging rollers 102 thus serve to both laterally guide and slidably support the conduits 38.

Each of the roller assemblies 100 may be suitably supported on a support stand 106. These stands 106 may be comprised of a generally vertically extending support member 108, and a generally horizontally extending support member 110. Each of the other support stations 26 may be similarly constructed; and the support sections 26 may be arranged in longitudinal alignment with one another, as more fully described in the aforementioned Smith application.

Figure 8:
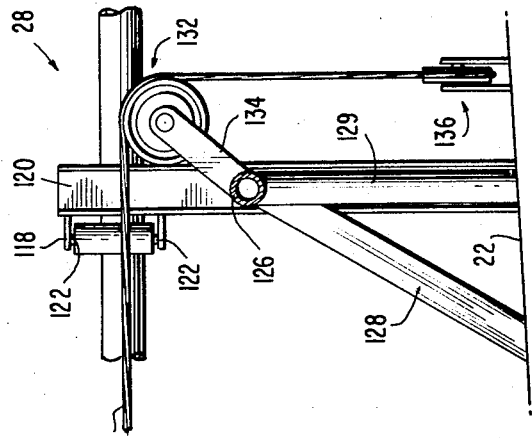
FIG. 8 is a partial cross-sectional view taken along line 8—8 of FIG. 7.
Figure 7:
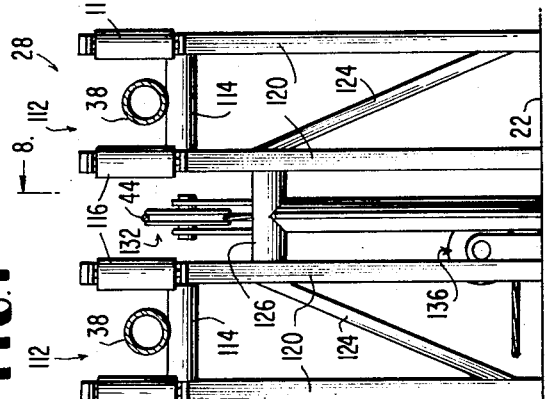
FIG. 7 is a transverse elevational view of a conduit payout station taken along line 7—7 of FIG. 1.

In FIGS. 7 and 8, an embodiment of the conduit guiding, supporting and payout station 28 is illustrated. This station 28 may be comprised of two roller assemblies 112 respectively cooperable with one of the two conduits 38 for lateral guiding and slidable support thereof. As more fully set forth in the aforesaid Smith application, the roller assemblies 112 may include a generally horizontally extending support roller 114 on opposite sides of which generally vertically extending guide rollers 116 may be positioned.

The lateral guiding rollers 116 may be supported on superimposed brackets 118 (FIG. 8) extending from generally vertical struts 120 at a suitable elevation. Rotatable mounting of the rollers 116 may be facilitated by shafts indicated at 122.

The struts 120 supported on the inclined ramp 22 may be braced relative to one another by generally diagonally extending interconnecting struts 124 which may also be of tubular configuration. The middle two generally vertical struts 120 may also be interconnected by a generally horizontally extending member 126, which may function as a support for a portion of a sheave assembly.

This support 126 may in turn be braced and supported by rearwardly inclined and vertical supporting struts 128 and 129. The outer generally vertical supports 120 may be additionally braced by inclined supporting struts (not shown).

Included in the sheave assembly is a cable supply pulley 132 mounted for rotation about a generally horizontal axis. A bracket 134 may serve to rotatably interconnect the pulley 132 to the sheave support member 126.

Suitably mounted on the inclined ramp 22 below the first pulley 132 is an additional pulley 136. This pulley functions as a feed pulley in a manner more fully described in the aforesaid Smith application.

A suitable tensiometer 83 may be employed to control the tension of the flexible cable 44 passing from the deck winch around the feed pulley 136 and around the servicing pulley 132 (see schematic illustrations in FIG. 3). In the arrangement illustrated, the cable 44 emerges intermediate the roller assemblies 112.

Between the payout station 28 and a guiding and supporting station having a single roller assembly station 30 (see FIGS. 3 and 4), the conduits 38 are caused to converge toward one another for bundling. If desired, this convergence may be initiated at the payout station 28 by proper spacing of the roller assemblies 112, and the first guiding and supporting station 30 may include two roller assemblies. Adjacent the single roller assembly station 30, bundling of the conduits 38 is effected at the bundling stations 29 to produce a pipeline bundle illustrated in top plan in FIG. 5. From FIG. 4 it may be seen that the single roller assembly supporting station 30 may include a transverse supporting member 52 suitably mounted on generally vertically extending supporting beams 54, as more fully set forth in the aforementioned Smith application. The roller assembly 112 itself may be similar to the roller assemblies 112 of FIGS. 7 and 8.

In summary, a pipeline bundle laying operation according to the present invention entails the establishment of feed paths where generally lateral guiding and longitudinal support of the conduits is accomplished on the floating vessel means. These feed paths may be initially provided by the roller assemblies at the guiding stations 26. During the initial portion 40 of the feed path defined by the guiding sections 26, the end portions of the conduits on the floating vessel means are maintained generally laterally spaced from one another.

However, the feed paths are situated such that the conduits eventually converge toward a bundling area 31 on the inclined ramp portion 22 of the floating vessel means 20. Details of this bundling area 31 located adjacent the first single roller support assembly 30 may be further understood with particular reference to FIGS. 2–5.

At the bundling area 31 a plurality of the bundling stations 29, each comprised of a bundling assembly, are preferably located. Each bundling assembly may include a winch 62 including a drum 63, provided with a flexible wire 64 that functions as a cable girding means. The winches 62 may be suitably supported such as by means of a platform 65.

On the opposite sides of the conduits 38 passing longitudinally along the winches 62 are located wire stopper means 66 of any suitable type. These may be mounted by a chain as indicated at 67. In effect a bundling of the conduits 38 at the chosen spaced bundling zones, sufficient wire 64 is pulled from the associated winch drum 63 to pass around all conduits 38 in the form of a clove hitch.

In other words, the wire 64 is passed around the conduits 38, over the standing part (indicated at 68 in FIG. 5), around the object again and under the last turn.

The free end of the wire 64 is secured by a suitably mounted clamp means 66 that functions as the wire stopper means 67.

Thereafter, the wire 64 is hauled taut by the winch 62 to bring the conduits toward one another and is then clamped in its taut position. This clamping is accomplished by one clamp means 70 placed around the wire crossover 72 and the hauling part 74. Two additional clamp means 76 are placed around the standing part 68 and the adjacent portions of wire 64. After tightening all three clamps, the wire is cut in any suitable manner. Generally at least 6 inches from the outer clamp means 76 is preferred for the cutting location.

It will be appreciated that at the feeding station 28, the tensioned cable means 44 is interposed intermediate the conduits. As earlier mentioned, control of the tension of the cable means controls the stress level and payout of the pipeline bundle 32.

Figure 5:
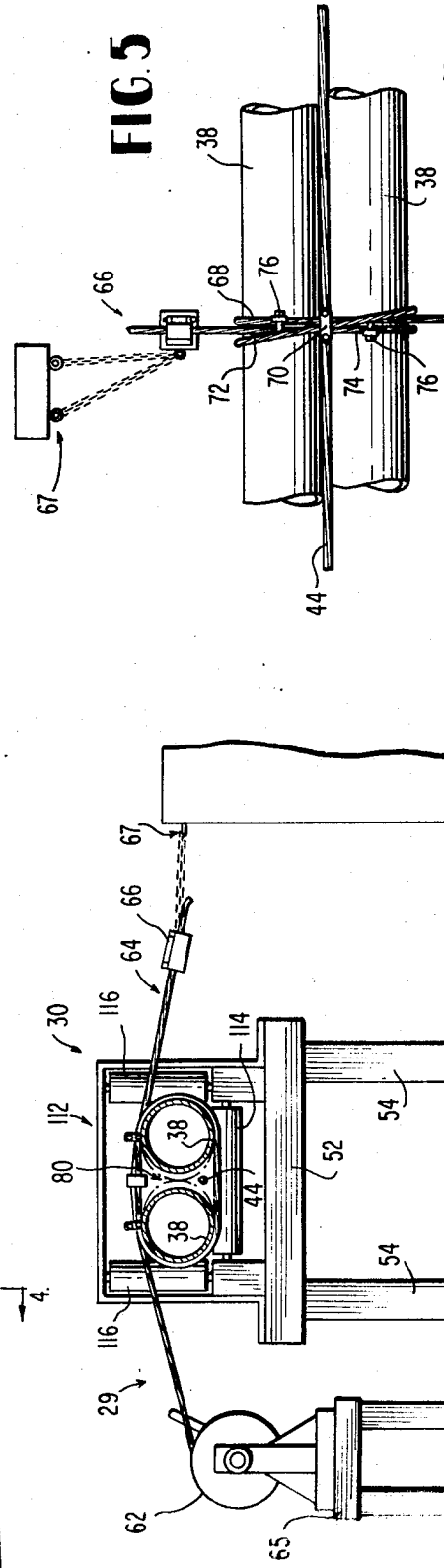
FIG. 5 is an enlarged partial top plan view of a bundling station such as that illustrated in FIG. 4.
Figure 4:
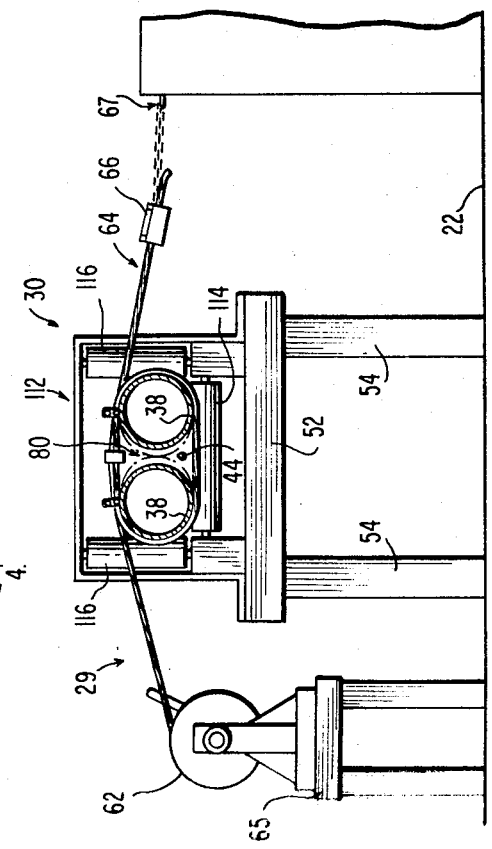
FIG. 4 is a transverse elevational view illustrating a conduit bundling station and taken along line 4—4 of FIG. 3 and depicting, in phantom, the orientation of a payout cable means relative to the conduits after a cable girding means is hauled taut.

As may be seen in FIGS. 4 and 5, the cable means 44 is so located as to be positioned within the confines of the bundle envelope defined by the cable girding means 64. Unlike the arrangement disclosed specifically in the aforementioned Smith application, the cable means 44 extends essentially freely longitudinally of the pipeline bundle. In other words, the cable means is not trapped utilizing, in addition to the conduits, spacer means or wire line clamps to impede relative longitudinal movement of the pipeline bundle along the longitudinally extending cable.

It should be here noted, however, that the spacing between adjacent bundling zones, i.e., the distance between consecutive locations of installed girding means 64, is sufficiently close as to prevent substantial relative longitudinal movement of the bundle along the cable 44 during the laying operation. In FIG. 3, two bundling assemblies are located at the bundling station for this purpose. These assemblies are independently operable and are located in the illustrated embodiment to provide bundling zones spaced by about 20 feet yielding two bundling zones per each section (about 40 feet) of the conduits 38. In this fashion, the pipeline bundle is impeded against substantial sagging after leaving the vessel 20 and thus the bundle is suspended by and operatively coupled to the cable means 44 without riding down that cable means.

The cable 44 may therefore be payed out by forward movement of the vessel 20 while controlling the tension in the cable to control its profile and that of the continuous pipeline bundle. Additional bundling operations are then performed at the bundling stations 29 after pay out of a sufficient length of the bundle 32.

With renewed reference to FIG. 4, it may be seen that the cable 44 is preferably initially located below an upper nip zone 80 defined by the generally parallel conduits held adjacent one another by the girding means 64 at the bundling zones. This is illustrated in phantom in FIG. 4, with the phantom position of the conduits 38 indicating the arrangement after the girding means 64 is hauled taut.

Between the overbend portion of the pipeline bundle (indicated at 82 in FIG. 1) and the portion of the pipeline bundle adjacent the submerged surface 36, the tensioned cable 44 is caused to snap between the conduits 38 from the lower nip zone into the upper nip zone 80. At this point the flexible girding means 64 of course permits such action, and at the same time traps the cable means 44 as will be appreciated. This snapping phenomenon is brought about by reason of play in the system comprised of the conduits 38, the clamped flexible girdling means 64, and the tensioned cable 44.

SUMMARY OF ADVANTAGES

From the foregoing, it may be seen that according to the present invention an efficient method and apparatus for laying a pipeline bundle by employing a cable to control the profile of the bundle are provided. Particularly, the integrity of the pipelines and the bundle is maintained.

Of independent significance is the positioning of the cable means so as to extend essentially freely longitudinally of the bundle within the confines of the bundle envelope to operatively couple the bundle to the tensioned flexible cable means by suspending the bundle therefrom while the bundling zones are sufficiently closely spaced to prevent the bundle from riding down the cable means.

Additionally advantageous is the enhanced stability that may be realized by initially positioning the cable means below the upper nip zone defined by the adjacent conduits held by the girding means at the bundling zones.

Further advantages are provided through the operationally easy and efficient clove hitch girding arrangement.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A method of laying an elongate, flexible continuous pipeline bundle comprised of a plurality of elongate, flexible, continuous conduits, from a floating vessel and onto a submerged surface, the method comprising:

supporting a portion of the plurality of conduits on the floating vessel with a further portion thereof depending into a body of water toward the submerged surface;

extending a tensioned and elongate, flexible cable means from the floating vessel toward the submerged surface;

bundling the plurality of conduits together, at a plurality of bundling zones spaced longitudinally along the conduits, by girding means surrounding the conduits and defining a bundle envelope;

positioning the cable means so as to extend essentially freely longitudinally of the pipeline bundle within the confines of the bundle envelope to operatively couple the pipeline bundle to the tensioned flexible cable means by suspending the pipeline bundle from the cable means while the bundling zones are sufficiently spaced as to prevent substantial relative longitudinal movement of the pipeline bundle along the essentially freely longitudinally extending cable means; and paying out the flexible cable and the suspended continuous pipeline bundle into the body of water while controlling the tension in the flexible cable to control the profile thereof and the profile of the continuous pipeline bundle.

2. The method according to claim 1 wherein the step of bundling comprises bundling the conduits at bundling zones by:

surrounding the conduits with cable girding means in the form of a clove hitch;

bringing the conduits toward one another in the bundle by hauling the cable girding means taut; and clamping the cable girding means in the taut position.

3. The method according to claim 2 wherein:

the step of positioning the cable means so as to extend essentially freely longitudinally of the pipeline bundle comprises initially locating the cable within the bundle envelope below an upper nip zone defined by conduits held adjacent one another by the girding means at the bundling zones.

4. The method according to claim 3 wherein:

the step of paying out the flexible cable and the suspended continuous pipeline bundle comprises snapping the flexible cable between the conduits held adjacent one another by the girding means into the upper nip zone as the pipeline bundle is payed out.

5. The method according to claim 1 wherein:

the step of positioning the cable means so as to extend essentially freely longitudinally of the pipeline bundle comprises initially locating the cable within the bundle envelope below an upper nip zone defined by conduits held adjacent one another by the girding means at the bundling zones.

6. The method according to claim 4 wherein:

the step of paying out the flexible cable and the suspended continuous pipeline bundle comprises snapping the flexible cable between the conduits held adjacent one another by the girding means into the upper nip zone as the pipeline bundle is payed out.

7. Apparatus for laying a continuous pipeline bundle, comprised of a plurality of conduits, onto a submerged surface comprising:

a floating vessel means from which the continuous pipeline bundle extends toward the submerged surface;

a plurality of girding means, surrounding the conduits and defining a bundle envelope, for bundling the plurality of conduits together at a plurality of bundling zones spaced longitudinally along the conduits;

cable means extending from said floating vessel means essentially freely longitudinally of the continuous pipeline bundle within the confines of the bundle envelope; and payout means on said floating vessel means for imparting tension to said cable means;

said cable means being operable to suspend the pipeline bundle while the bundling zones are sufficiently spaced as to prevent substantial relative longitudinal movement of the pipeline bundle along the essentially freely longitudinally extending cable means.

8. The apparatus according to claim 7 wherein said girding means comprises:

cable girding means surrounding the conduits in the form of a clove hitch, and clamping means for clamping said cable girding means in a taut position with the conduits brought toward one another.

* * * * *